(12) United States Patent
Triou, Jr. et al.

(10) Patent No.: US 7,509,538 B2
(45) Date of Patent: Mar. 24, 2009

(54) SYSTEMS AND METHODS FOR AUTOMATED CLASSIFICATION AND ANALYSIS OF LARGE VOLUMES OF TEST RESULT DATA

(75) Inventors: Edward Triou, Jr., Duvall, WA (US); Andre Milbradt, Snoqualmie, WA (US); Osarumwemse U. Agbonile, Bothell, WA (US); Affan Arshad Dar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 612 days.

(21) Appl. No.: 10/828,947

(22) Filed: Apr. 21, 2004

(65) Prior Publication Data

US 2005/0257086 A1    Nov. 17, 2005

(51) Int. Cl.
G06F 11/00 (2006.01)
(52) U.S. Cl. .................................................. 714/48
(58) Field of Classification Search .................. 714/48
See application file for complete search history.

(56) References Cited

U.S. PATENT DOCUMENTS

| | | | | |
|---|---|---|---|---|
| 4,964,125 | A * | 10/1990 | Kim ............................ | 714/26 |
| 5,109,380 | A * | 4/1992 | Ogino ......................... | 714/26 |
| 5,808,919 | A * | 9/1998 | Preist et al. ................. | 702/183 |
| 6,223,306 | B1 * | 4/2001 | Silva et al. ................... | 714/37 |
| 6,438,716 | B1 * | 8/2002 | Snover ........................ | 714/57 |
| 6,473,659 | B1 * | 10/2002 | Shah et al. ................... | 700/79 |
| 6,622,264 | B1 * | 9/2003 | Bliley et al. .................. | 714/26 |
| 6,920,587 | B2 * | 7/2005 | Dawkins et al. .............. | 714/48 |
| 7,035,898 | B1 * | 4/2006 | Baker .......................... | 709/203 |
| 7,058,860 | B2 * | 6/2006 | Miller et al. .................. | 714/47 |
| 2002/0053054 | A1 * | 5/2002 | Chiu ........................... | 714/724 |
| 2002/0124213 | A1 * | 9/2002 | Ahrens et al. ................. | 714/57 |
| 2003/0208706 | A1 * | 11/2003 | Roddy et al. ................. | 714/48 |
| 2004/0250163 | A1 * | 12/2004 | Roddy et al. ................. | 714/25 |

OTHER PUBLICATIONS

Beer, A. et al., "IDATG: An Open Tool for Automated Testing of Interactive Software," *Proceedings, The Twenty-Second Annual International Computer Software and Applications Conference (Compsac '98)*, Vienna, Austria, Aug. 19-21, 1998, 470-475.

(Continued)

*Primary Examiner*—Scott T Baderman
*Assistant Examiner*—Paul F. Contino
(74) *Attorney, Agent, or Firm*—Woodcock Washburn LLP

(57) ABSTRACT

Test result data can be classified across multiple tests, test scenarios, and lab runs. Test result files can be parsed by extracting information from them. Extracted information can be compared to failure information in a database. If a match is found, the extracted information can be linked to the failure, creating a history for each failure. New failures can be identified when no match is found. Failure data can be cross-referenced to further aid in results analysis. For each failure, lists of useful information can be accessed. Analysis information can be associated with failures, for example whether the failure is new, occurred previously, is for a different reason than expected, or has been added to a baseline of expected failures. A Graphic User Interface ("GUI") is also provided to expose the analyzed results to the result analyzers.

11 Claims, 11 Drawing Sheets

OTHER PUBLICATIONS

Leung, H.K.N., "Test Tools for the Year 2000 Challenges," *Proceedings, 24th Euromicor Conference*, Vasteras, Sweden, Aug. 25-27, 1998, vol. 2, 830-837.

Lutsky, P., "Information Extraction from Documents for Automating Software Testing," *Artificial Intelligence in Engineering*, 2000, 14(1), 63-69.

Pennanen, V. et al., "TBGA Reliability in Telecom Environment," *Soldering & Surface Mount Technology*, 2000, 12(2), 42-46.

von Bochmann, G. et al., "Test Result Analysis and Validation of Test Verdicts," *Protocol Test Systems, III: Proceedings of the IFIP TC6 Third International Workshop*, McLean, Virginia, Oct. 30-Nov. 1, 1990, 263-274.

von Bochmann, G. et al., "Test Result Analysis with Respect to Formal Specifications," *Protocol Test Systems: Proceedings of the IFIP TC6 Second International Workshop*, Berlin, West Germany, Oct. 3-6, 1989, 103-117.

Walker, T., "Cruise Control—A Step-By-Step Guide to Automated Software Testing," *Chem. Engineering*, 2001, 108(10), 51-53, 56, 58 and 60.

\* cited by examiner

SYSTEMS AND METHODS FOR AUTOMATED CLASSIFICATION AND ANALYSIS OF LARGE VOLUMES OF TEST RESULT DATA

FIELD OF THE INVENTION

This invention relates to testing, and more particularly to test result analysis.

BACKGROUND OF THE INVENTION

Testing involves performing an operation to determine if the actual result matches an expected result. If the actual and expected results do not match, the test is failed. The classic test is that of a child in school. A child is asked to perform an operation, e.g., a math problem. If the child produces an incorrect result, the test is failed. This information is valuable to the teacher, because it provides an indicator of whether the lessons are effective. It may also provide an indicator of the child's ability.

Today, testing is widely used in virtually every industry to determine valuable information about products, systems, employees, organizations, and more. Moreover, a single test may be insufficient to gather desired information. A company that is attempting to increase the safety of a product, for example, may conduct many tests in different scenarios. A large car may perform quite well in a head-on collision test, but may perform poorly in a rollover test. The overall safety of a vehicle may be measured by a number of tests that are prioritized by frequency of the test scenario in the real world.

Software developers in particular make heavy use of testing. Buyers of software products expect those products to work on their computer systems. A product that has not been fully tested may simply cause irritation if it causes computer system malfunctions, but it may also cause more serious problems such as opening a security loophole for attackers or causing the loss of large amounts of valuable data. In response to the need for software testing, there have been a number of advancements in the field. These advancements are generally directed to determining the appropriate software tests to run, test results analysis, and automation of performing tests.

First, determining which scenarios to test is important in software testing. Just as a car encounters many scenarios on the road, software operations occur in many scenarios within computer systems. Computer systems are built using a wide variety of components, which may be configured differently. The state of the components changes when they are called upon to execute software. Therefore modern software testing involves not only testing the many operations that an application may perform, but testing those operations in a subset of the various scenarios in which the operations are likely to occur. It may be significant that an operation is performed while a computer is also running MICROSOFT WORD®. It may also be significant that a computer has a wireless internet connection, or that the computer has both a wireless internet connection and runs MICROSOFT WORD® when an operation is performed. There are so many variables that testing an operation in every single possible computer state is impractical. Therefore, a determination of which computer states to test is an important aspect of software testing.

Second, test results analysis is an area of advancement in software testing. This term, however, can mean several different things. In a traditional sense, it refers to investigation of why a particular operation failed a test. Products developed by VECTOR SOFTWARE®, VIASOFT®, and MERCURY INTERACTIVE® provide some tools for test result analysis. Some such tools also provide statistics on failure rates, e.g., they compute a percentage of tested operations that failed. They may also compute failure percentages for each operation, thereby providing a percentage of scenarios in which a given operation, such as "open file" failed. Developers may set a target failure rate for their product, such as 99%, which suggests that 99% of the scenarios in which an operation is performed will not yield failures. As soon as a given operation works 99% of the time, investigation of failures for the product can cease and the product is ready to ship. This approach, however, is weak in that the failures that are not solved may be particularly troublesome. Therefore tools that provide failure statistics do not lend themselves to ideal techniques for software testing.

Finally, the software testing industry has seen much advancement in automation of software testing. This is largely because of the sheer volume of tests that are generally considered desirable. Because software is often quite complex, there are many operations performed by any given application that may need testing. For example, an application may both open a document and close a document. It may also manipulate a document in any number of ways, which can be appreciated by any computer user.

The many software operations that may be tested combined with many test scenarios produces a potentially enormous number of tests that may be desirable in testing software. This concept is demonstrated in FIG. 1. For example, consider the testing that may be desired by a hypothetical software developer who writes an application 100 called "Jammer" for playing and editing music files. One of the many operations performed by Jammer is opening a file 101. Imagine that our hypothetical application 101 is opening a music file, e.g., "Smooth" sung by Santana and Rob Thomas. To ensure that this opening operation 101 will be performed smoothly in all scenarios in which it may be performed, the Jammer 100 developer may first test it in all of the various operating system environments 120 it may be performed. The Jammer 100 developer may acquire one computer for the MICROSOFT WINDOWS XP ("XP") operating system, another for the MICROSOFT WINDOWS 2000 operating system, another for the APPLE MAC OS X operating system, etc. Testing only these operating systems 120 would require three tests: opening "Smooth" with Jammer 100 running on each of the operating systems 120. However, the operating systems may be used in connection with various processors 130 that affect the way the operating systems 120 run. For example, imagine that each of the operating systems 120 may run on a computer using any of the processor families INTEL CELERON®, AMD THUNDERBIRD®, and INTEL PENTIUM IV®. By introducing an additional variable, namely processors, which itself has three variations, suddenly there are nine tests to perform.

By extrapolating from FIG. 1, the potential magnitude of tests for software products becomes apparent. The operating systems 120 shown are not representative of all operating systems, and each operating system may have different versions for different languages. For example, there is an XP English version, an XP German version, an XP Spanish version, etc. Likewise, the processor families shown are just that—families of processors. Testing for each individual processor, as well as for other popular processor families, may be desired. Still further, operating systems and processors are only two of many variables that may be adjusted. Every time a new variable is added the number of tests can multiply by the number of possible variations, or states, of the new variable. This explosion is illustrated in the table 140 at the bottom of FIG. 3. A number of variables 150 are displayed across the top of the table 140. A number of states of each variable 160 is displayed on the left side of the table. The corresponding number of tests to be performed is presented. For 8 variables, each with 6 states, there are 1,679,616 tests to perform. As a result of this explosion in the number of tests, there have been significant advancements in automating software testing, directed to the automatic set up of tests and return of result files bearing information about the test failures that may help the process of failure investigation.

There are many software testing products currently available. AUTOTESTER® from AUTOTESTER®, HOUR-GLASS 2000® from MAINWARE®, OPTA2000® from TANDSOFT®, PANORAMA-2® from INTERNATIONAL SOFTWARE AUTOMATION®, SIM2000® from DPE & ASSOCIATES®, SIMULATE 2000® from PRINCE SOFTWARE®, TARGET2000® from TARGETFOUR®, TRANSCENTURY DATE SIMULATOR® and ENTERPRIZE TESTER® from PLATINUM®, TALC 2000® from EXECOM®, TICTOC® from CICS®, TEST 2000® and AGER 2000® from MVS®, VECTORCAST® from VECTOR SOFTWARE®, VIA/AUTOTEST® from VIASOFT®, TEST SUITE 2000® from MERCURY INTERACTIVE®, and WORKBENCH/2000® from MICROFOCUS® are all products aimed at software testing. These products are software that may generally help in analyzing relevant scenarios for software testing, determining why failures occurred, and automating the set up of tests in a way that returns useful test result files.

Available testing products, and testing technology generally, have improved software testing to the point that a large volume of useful tests can be run quickly and return result files that aid in the investigation of failures. Perhaps in part as a result of these advancements, another problem has appeared in the industry: the proliferation of test results. Currently, a set of test operations may be run automatically in a lab run that involves performing a number of tests in a variety of scenarios. A short lab run for a commercial software developer, which tests only a subset of operations against a single operating system, may approach 300,000 tests. A full lab run—all tests performed in all scenarios—may go well beyond 1,000,000 tests.

A good lab run, with few failed tests, may yield an average pass rate of approximately 95%. If a developer wants to investigate all failures, this means that there may be well over 50,000 failures to investigate. Furthermore, numerous lab runs may be conducted per week for products in the final stages of development. There may also be multiple products to be tested, along with updates to products that are often distributed by software developers. In this environment, verification of test results quickly becomes an unmanageable task. Employees hired to investigate failures may spend significant time verifying lab run results, thereby diminishing resources for other testing activities such as writing new tests or improving existing tests.

The proliferation of test results and the corresponding test analysis resources have not been met with sufficient technological advancements in reducing the labor involved in test result analysis. Currently, test result files can be differentiated, whereby identical result files can be categorized together. This provides some help in allowing test result analyzers to group identical failures over multiple lab runs, but result files may differ slightly even if a failure occurred for the same reason, simply because the failure occurred in different computing environments. Categorization based on entire result files therefore often requires redundant attention from result analyzers to slightly different result files.

Another technique currently in use allows a result analyzer to identify one or more particular result files that they know are associated with an expected "bug" or imperfection in software. All result files that match an exact specified description associated with the expected bug can be stripped from the set of result files to be examined. Alternatively, the tests that produce failures associated the known bug can be discontinued from future lab runs until the bug is resolved. This solution is practical but less than perfect, because it may be desirable to continue running the test associated with a bug for other computing environments and to keep the generated result files for analysis. Simply discontinuing tests raises a coverage problem, creating a blind spot in the testing of a software product.

In light of the forgoing deficiencies in the analysis of test results, there is a heretofore unaddressed need in the industry to provide improved techniques for automated test result analysis.

SUMMARY OF THE INVENTION

Systems and methods for automated test result analysis provide for grouping related test result files across multiple tests, test scenarios, and lab runs. Test result analyzers can update the system to provide further sophistication in grouping test results, and can access and categorize the results by multiple useful parameters.

Test operation results can be extracted by parsing the result files. Any information can be extracted, for example the output of a tested operation, error call-stacks, and whether the test operation passed, failed, or yielded an exception, a warning, a timeout, or other result. Extracted information, referred to as failure data, may be tagged with identifying information, uploaded to a database, and processed by a stored procedure.

The stored procedure can compare extracted failure data to failures stored in a database. Both exact and inexact matches can be found. Inexact matches may be found by ignoring some properties of failure data. Properties to be ignored can be designated by a test analyzer or the system itself. Another technique for finding inexact matches is to designate failure data patterns to match. Allowing for inexact as well as exact failure data matching enables grouping of related failures despite some differences in such data sections that may be irrelevant. By automatically ignoring information about the scenarios, or configurations, that a particular test is run in, matches can be found across one or more configurations. By collapsing like failures that occur in a multitude of scenarios, a single failure can represent a many failures, thereby facilitating failure analysis.

Uploaded failure data can be linked to an already existing representative failure identifying a group of test failures. Linking failure data in a database to prior failures allows the system to keep a history of test failure information.

In addition to grouping related failures, the stored procedure can separately attach any other data to the failure data. For example, scenario data identifying the environment in which a test was conducted may be separately associated to the failure data. This allows for a list of all scenarios in which a particular failure occurred. Bug data can be linked to failure data, giving all bugs associated with a failure, and so on.

If newly uploaded test failure data cannot be matched to an already stored failure, a new failure can be identified. Subsequent test failures can now be compared to this new failure. New failures can be tagged as such and brought to the attention of result analyzers. Other information regarding a particular failure may also be brought to the attention of result analyzers and/or stored with the failure itself. A failure may be identified as corresponding to a failure that occurred previously but that has not been incorporated into a baseline of expected failures. A failure can also be identified as a failure of a test that previously failed, but failed for a different reason. Such identification of failures allows result analyzers to prioritize investigation of failures. The system allows for the generation of a baseline list of expected test failures. Such a categorization allows test analyzers to not have to reinvestigate already inspected failures.

A Graphic User Interface ("GUI") is also provided to expose the analyzed results to the result analyzers. The GUI can contain a workspace tree 700 that allows the tester to hierarchically navigate through various automated lab runs based upon dates, teams, components, versions, builds, or any other parameter. It can contain a visual query builder 702 that supports custom queries over the analyzed data. It can contain a failure tree that can display failures requiring investigation, e.g., failures that have not been designated as baseline failures. It can provide a space to comment upon investigated failures, and predefined categories may be associated with failures, such as "bug," "test issue," and "lab issue."

DETAILED DESCRIPTION OF ILLUSTRATIVE EMBODIMENTS

Figure 1:
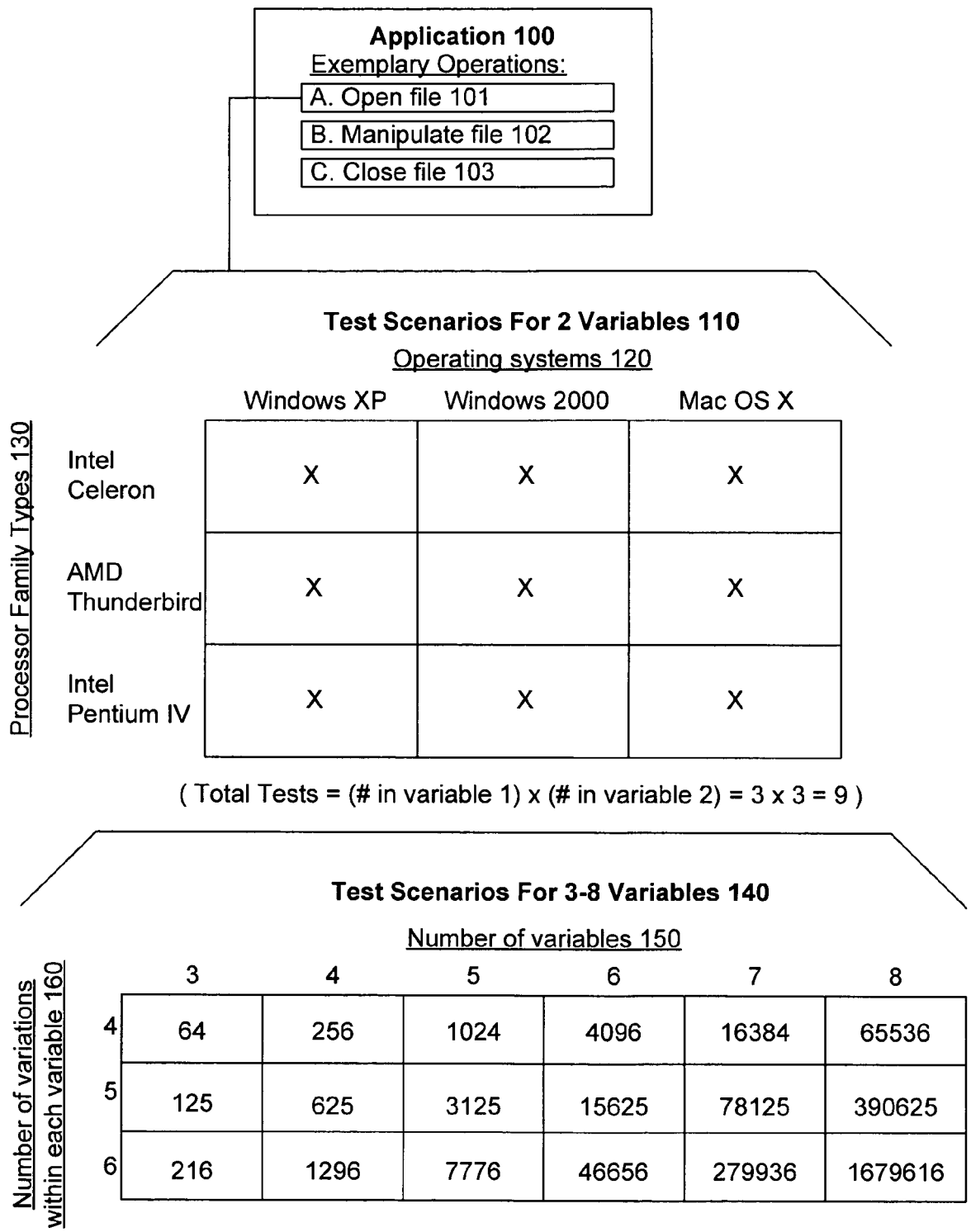
FIG. 1 illustrates the cause for the proliferation of test results in the software testing industry. Multiple operations are tested against an ever-increasing number of scenarios.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. While various methods are described with reference to steps and sequences in the following disclosure, the description as such is for providing a clear implementation of embodiments of the invention, and the steps and sequences of steps should not be taken as required to practice this invention.

Moreover, it should be noted that while the following description generally contemplates the use of the techniques provided in conjunction with software testing, many industries use comprehensive testing and could benefit from the invention disclosed herein. The concepts introduced herein can be readily applied to test result analysis and verification for any set of computer readable result files. Therefore, a test result file for use with the techniques provided herein could bear information about fields as far reaching as the automotive industry, industrial systems, products manufacturing, scientific study and data gathering, environmental studies, education, social and political science, or any other field that gathers and analyses large quantities of test results. The language of software testing is used to provide a useful context to explain the invention and because the invention is particularly suited for software testing, because software testing often occurs in an automated environment where tests can be run very fast and test data can be automatically stored comparatively cheaply, contributing to a proliferation of test results.

The following detailed description of the embodiments of the invention will begin with a description of the infrastructure and methods for test result analysis and verification, and then proceed to describe the GUI that has been developed to facilitate exposure of the stored test results and representative test failures.

Test Result Analysis

This section provides detailed description of components and aspects of the invention set forth in the summary of the invention section, explaining and expanding upon the elements set forth in that section as appropriate.

Test result files are computer readable files containing information about a test and the result of the test. Test result files can be automatically generated, as in the case of automated software testing, or can be manually generated by a human entering information about test results into a computer. Test result files can contain any information about tests and test results. The information in a test result file often varies depending upon the test and what information from a test is considered useful. For example, in an automobile collision test, the outdoor temperature may not be considered useful information to store in a test result file, while the fact that it was or was not raining when the test was performed may be considered useful information. In the area of software testing, information about some aspects of a hardware configuration on which a test is run may be considered useful while other hardware configuration information may not be considered useful.

Test Result Files

A test result file can be stored in any computer readable format currently in use or later developed. A standard test result file today comes in Extensible Markup Language ("XML") format, which utilizes tags to identify data in a file. Other file formats will also work with embodiments of the invention. Some other file markup syntaxes are the Hyper-Text Markup Language ("HTML") and the MICROSOFT WORD® Markup Language ("WordML"). Numerous other file formats are available and often vary based on an application designed to use the format. A file can be in .doc, .txt, .rtf, .pdf, or .vsd format, to name only a few. While some file formats, and especially XML, is considered a likely candidate for use with the invention, it is not limited to the file format in which individual test results are packaged. Regardless of result file formats, a program can be written to parse the file and obtain the failure data for use in connection with the techniques of the invention.

Figure 2:
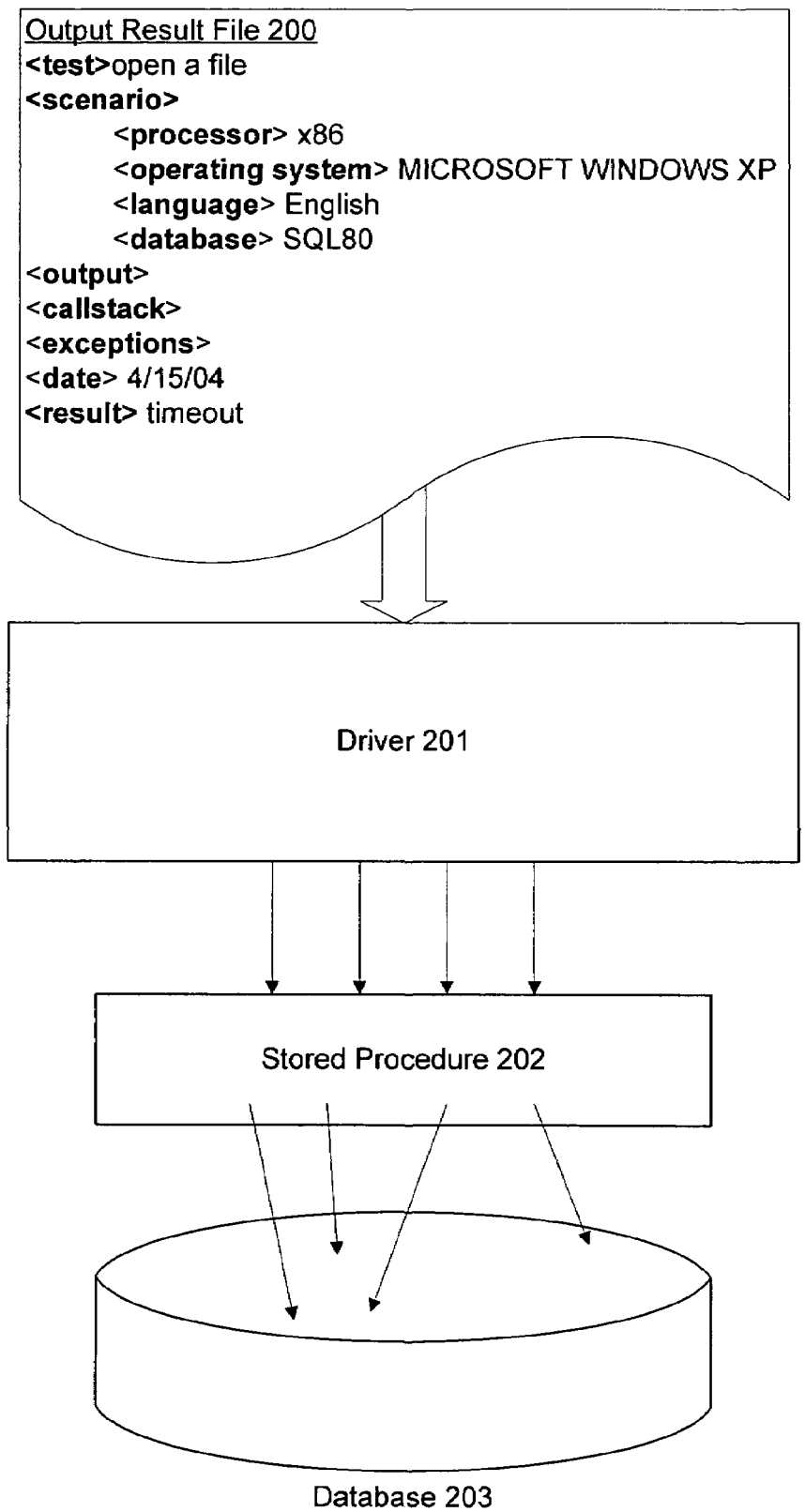
FIG. 2 illustrates a parsing operation that can be performed by a driver. Information can be extracted from a test result file, organized as desired, and uploaded to a database.

Parsing a result file refers to breaking it into smaller chuniks so a program can act upon the information. In this regard, imagine an XML result file 200 such as that of FIG. 2. A first line in the result file 200 identifies a test that was conducted, "open a file." A second through sixth line identifies scenario information for the test. Parsing such a file 200 can involve writing a program such as driver 201 that extracts these lines. An A test result file 200 can be in any file format and can be consistently formatted according to a particular document structure to facilitate operations on the parsed result files. To use XML parlance, a result file 200 can conform to any schema. Schemas ensure that test data in a result file 200 are consistently tagged and structured, so that parsing operations can be easily performed The actual properties, or failure data, that is extracted by the driver 201 can vary at the discretion of those skilled in the art. Failure data should include relevant test result information that is likely to be useful for analysis. In the context of software testing, there are several result file 200 properties that are often considered useful in analyzing test failures. The following are examples of these properties not intended to limit the invention, but rather to demonstrate potential properties to be extracted from a result file 200. First, it may be desirable to extract the actual output of a tested operation. In other words, if a tested operation is "add the number four and the number five," and the expected result was "nine" but the actual output was "seven," it can be useful to have this information for analysis. Second, a test result itself is certainly a likely candidate for extraction from a test result file 200. A test can be passed or failed, or some other result that provides additional information about the result may be returned, such as "warning" indicating that the tested operation returned a warning, "exception," indicating that the tested operation returned an exception, "unknown" indicating that the result of the tested operation is not known, "timeout," indicating that the operation did not complete, or "aborted," indicating that an operation was aborted. Third, call-stack information, indicating the calls that were made in the course of the tested operation, may be useful to extract from a test result file 200. Fourth, any exceptions that were generated in the course of the tested operation may be useful to extract from a test result file 200.

Once failure data has been extracted from a result file 200 as set forth above, extracted failure data can be uploaded to a backend. A backend includes the stored procedure 202 and database 203 in FIG. 2. Simply storing failure data in a column of a database 203 would not prove to be very useful. Instead, failure data can be classified in useful groups by the stored procedure 202. These useful groups can be identified by representative failure characteristics. Moreover, failure data can be analyzed and separately linked to representative failures, providing quickly accessible information about particular failures.

Failure Data Analysis

Classification of failure data in a database according to failure characteristics can be accomplished by any computer program. Such a program compares the characteristics of incoming failure data to the characteristics of stored failures. A database stored procedure 203 is a program that can perform such a comparison, and in a preferred embodiment the preexisting ability of available database software may be leveraged to generate and carry out stored procedures tailored to the particular needs of a user of the software. Alternatively, any application may be created that performs such a comparison, for example by using the function calls exposed by a database API to request database services.

Failure Linking

Figure 3:
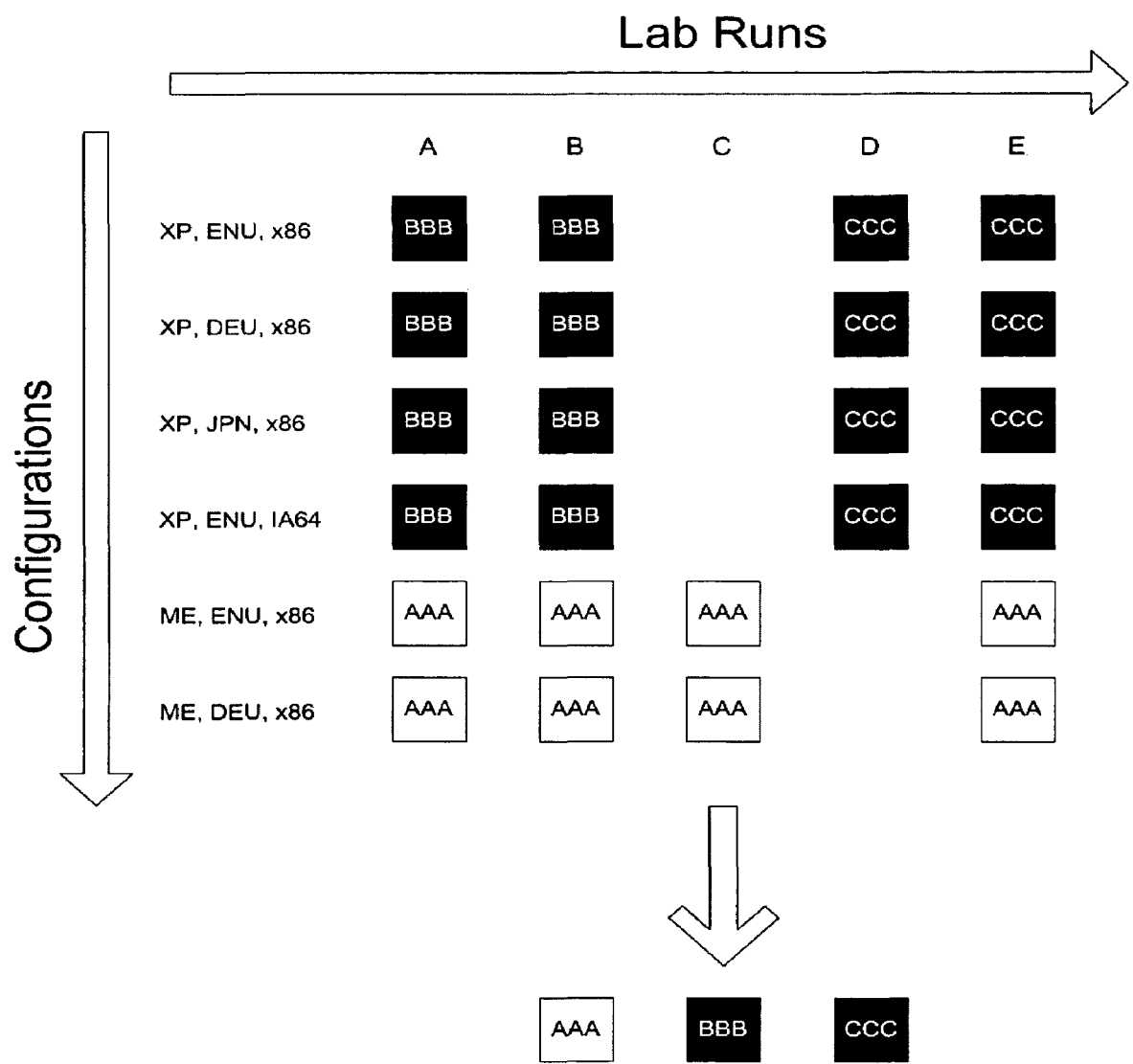
FIG. 3 illustrates the concept of collapsing failures. Multiple testing failures may be considered the same even though they occur in different environments. These failures may all be linked together under one representative failure in a database.

Failures that have occurred repeatedly across multiple lab runs, and are therefore the subject of multiple result files, can be represented by a single set of failure characteristics in a database to which many failures are linked. This concept is represented by FIG. 3. FIG. 3 shows an example of test results for a test that is run in multiple scenarios, or configurations. The configurations for this example are taken from the software testing industry. XP and ME are two types of operating systems. ENU stands for English Language, DEU is German, JPN is Japanese. X86 and IA64 are processor types. The letters A, B, C and so on across the top of the figure stand for various lab runs in which the exemplary test was run. The boxes with the triple letters "AAA," "BBB" and "CCC" stand for particular failures that resulted from the test. Where there is not an identified failure, no failure occurred. As FIG. 3 demonstrates, the same failures may occur again and again across multiple lab runs as well as across various configurations. These failures can be collapsed, as demonstrated by the arrow to the three identified failures at the bottom of the figure. Observing and investigating three identified failures is far easier for a human examiner than attempting to inspect every single failure instance.

By collapsing failures according to failure characteristics, a particular failure can be examined by a result analyzer. The entire history of the failure, as embodied by the various failure instances linked to the failure, may be accessed.

A result analyzer can look at a failure (as defined by a set of failure characteristics) and find out the circumstances in which the failure occurred. Moreover, this capability allows for a determination of which failures are new and which failures are not new. In general, result analyzers are more likely to be interested in new failures, because they may already be aware of old failures and attention to these failures may be redundant.

Classification warrants some further attention here because of the innovative ways in which classification may be carried out to achieve the goals of the invention. In general, classification involves comparing uploaded failure data with an existing set of failure characteristics to determine if there is a match. If there is a match, the uploaded failure data can be linked, via any available database linking techniques, to the matched failure characteristics. Requiring an exact match for every single aspect of uploaded failure data is certainly possible, and exact matches can be pursued first. However, there may be any number of reasons exact matches cannot be made even though failures should be classified together. For example, failure data may contain a time stamp indicating a time when the test was performed. Such a time stamp could be unique to a particular test. To thwart classification by demanding a matching time stamp would be contrary to the spirit of classification into useful groups. Similarly it may be preferable to ignore many other aspects of uploaded test failure data. The particular properties to be ignored for a given set of failure data are an implementation specific detail and it is not useful to attempt a list of such properties here.

Ignoring aspects of a failure may be accomplished by a computerized process, such as a stored procedure 202, which is designed to compare failure data to the expected characteristics, i.e., characteristics of a representative failure. It may also be accomplished in the software testing industry by writing tests that automatically tag some data in result files to be ignored. In this embodiment, result files may indicate which properties are to be ignored. If an incoming result file is in XML format, for example, failure data to be ignored can be tagged <ignore>, or given an ignore attribute. Of course, any other technique may be used to also mark result file properties to be ignored. The following abbreviated results file demonstrates a property of a file (a timestamp) that is designated to be ignored when matching result files to failure characteristics:

---

Results.xml

<Variation Id="2" Desc="f2">
...
<Ignore>
2/19/2004 9:20:35 PM
</Ignore>
...
<Result>FAILED</Result>
</Variation>

---

Properties of result files to be ignored can be left out of comparisons to failure characteristics stored in the database. They may also be ignored at the outset by a driver 201, and therefore never extracted and uploaded to a backend. By ignoring properties that will result in improper classification of failures, a meaningful classification can be maintained with a set of failures that are substantively similar, such that a single investigation of the failure suffices.

Another technique for finding inexact matches is to designate failure patterns to match. Failures that have data patterned in a particular way may all represent failures that are properly classified together. Often tests do not have control over the test output: this may be true in the case of product error strings containing generated data, for example. Alternatively, it may not be feasible to tag results file properties to be ignored. Techniques for specifying an abstract format to identify a file pattern are known and can be accomplished by those of skill in the art. Some database software contains functions that allow for this already, for example the LIKE clause support in MICROSOFT SQL SERVER. To use such a feature to allow pattern matching, failure characteristics can be specified using wildcards, or variable features that can replace any characters with the indicated expressions.

In addition to ignoring features for the purpose of comparison and linking, some failures can be collapsed into a single failure as illustrated in FIG. 3. For example, identical failures across all configurations can be automatically collapsed into a single failure. This allows for a single failure investigation that applies to a potentially very large number of individual test failures. This single investigation effectively disposes of the entire matrix of test scenarios in which a test was performed and failed for the same reason.

If a failure does not match an existing set of expected characteristics, a new failure can be identified with the characteristics of the non-matching failure data. Characteristics from a failure may be suitably generalized to identify a failure that will be matched by future uploaded failures bearing data that should be classified therewith. Subsequent failures can now be compared to this new failure, or the expected characteristics identified within the new failure, and associated with the identified failure. In the collapsing failures diagram of FIG. 3, envision a new failure "DDD" that occurred in lab run C in the uppermost configuration. Because "DDD" does not match any of the failures "AAA" "BBB" or "CCC," a new box with "DDD" can be added to the area under the arrow at the bottom of the figure. Further occurrences of "DDD" can be linked to the "DDD" failure.

Figure 12:
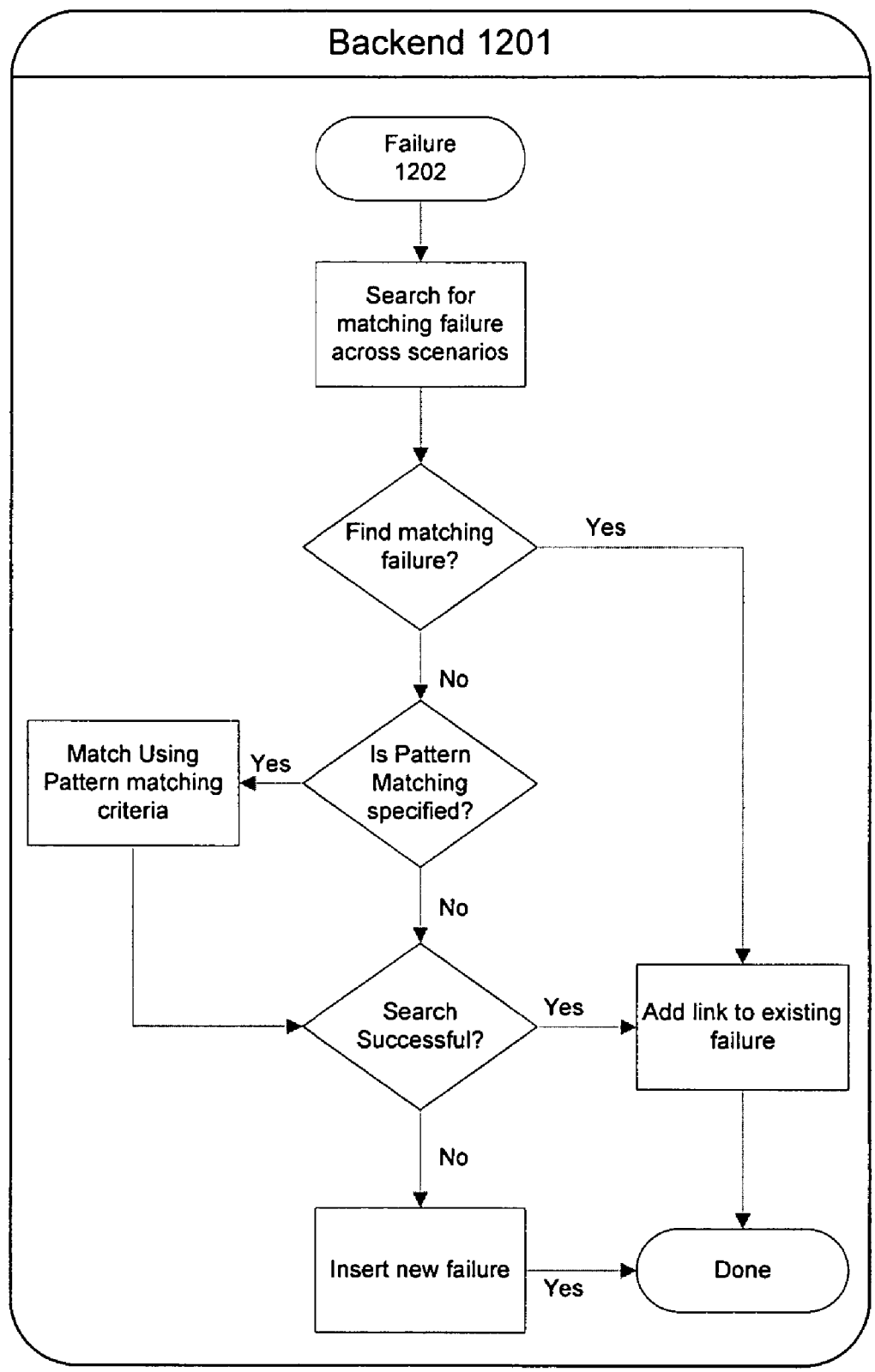
FIG. 12 illustrates an exemplary classification process for failure data that may be carried out by a stored procedure in the backend.

A useful overview of the classification process described above is provided by FIG. 12. The flowchart of FIG. 12 is illustrated as a process occurring within a "backend" 1201 or database. A backend 1201 comprises both the stored data of a database as well as the database engine software that makes the data available to the outside world. Walking through the steps of FIG. 12, the first item in the flowchart represents an incoming failure 1202. This failure 1202 represents properties of a failure that have been extracted for comparison to existing database failures. The stored procedure in the backend 1201 may take this incoming failure 1202 and search for matching failures across any number of scenarios. Properties that are declared to be ignored can be ignored in this matching process. As stated above, failures may be classified by any failure properties, and scenario information is likely to be ignored in many preferred embodiments. If a matching failure is found, the incoming failure 1202 can be linked to it immediately, as indicated by the "yes" option from the "matching failure found?" decision diamond.

If a matching failure is not found, further measures may be taken to find a match for an incoming failure 1202. These further measures can be taken automatically or specified by a result analyzer. The further measure may comprise pattern matching. If a failure can be matched using pattern matching, the failure can be classified accordingly by linking it to an existing failure. If not, it can be inserted as a new failure.

In addition to the classification, or collapsing, related failures as described above, additional techniques may be employed to facilitate analysis of test failures. Preferred embodiments of the invention can actually perform some useful test result analysis on behalf of a human result analyzer before the human begins. These techniques comprise identification and linking of expected failure data to provide quick identification of these characteristics for the various failures.

For example, in the software industry tests are usually performed in a specified operating system environment. The operating system is an important piece of information for result analyzers because it has a profound effect on the way an operation may be carried out. Therefore a test result file will generally include information identifying an operating system that was running when the test was performed. A result analyzer using the invention as described thus far could access information about all operating systems in which a particular failure occurred by looking through all the result files associated with the failure. However, this may become tedious. Alternatively, a result analyzer could formulate a query across the database in which the result files are stored to determine the set of operating systems for a particular failure. This too could be cumbersome, especially for information such as operating system information that may be frequently accessed.

Therefore various embodiments of the invention can facilitate access to such important test result file properties by separately linking these properties to an identified failure. A result analyzer can go straight to a list identifying, for example, all of the operating systems in which a particular failure occurred. This can be accomplished by automatically copying the relevant information from a result file to a database location that is linked to the appropriate failure. This process can be managed by any automated procedure, including the stored procedure discussed above.

Figure 4:
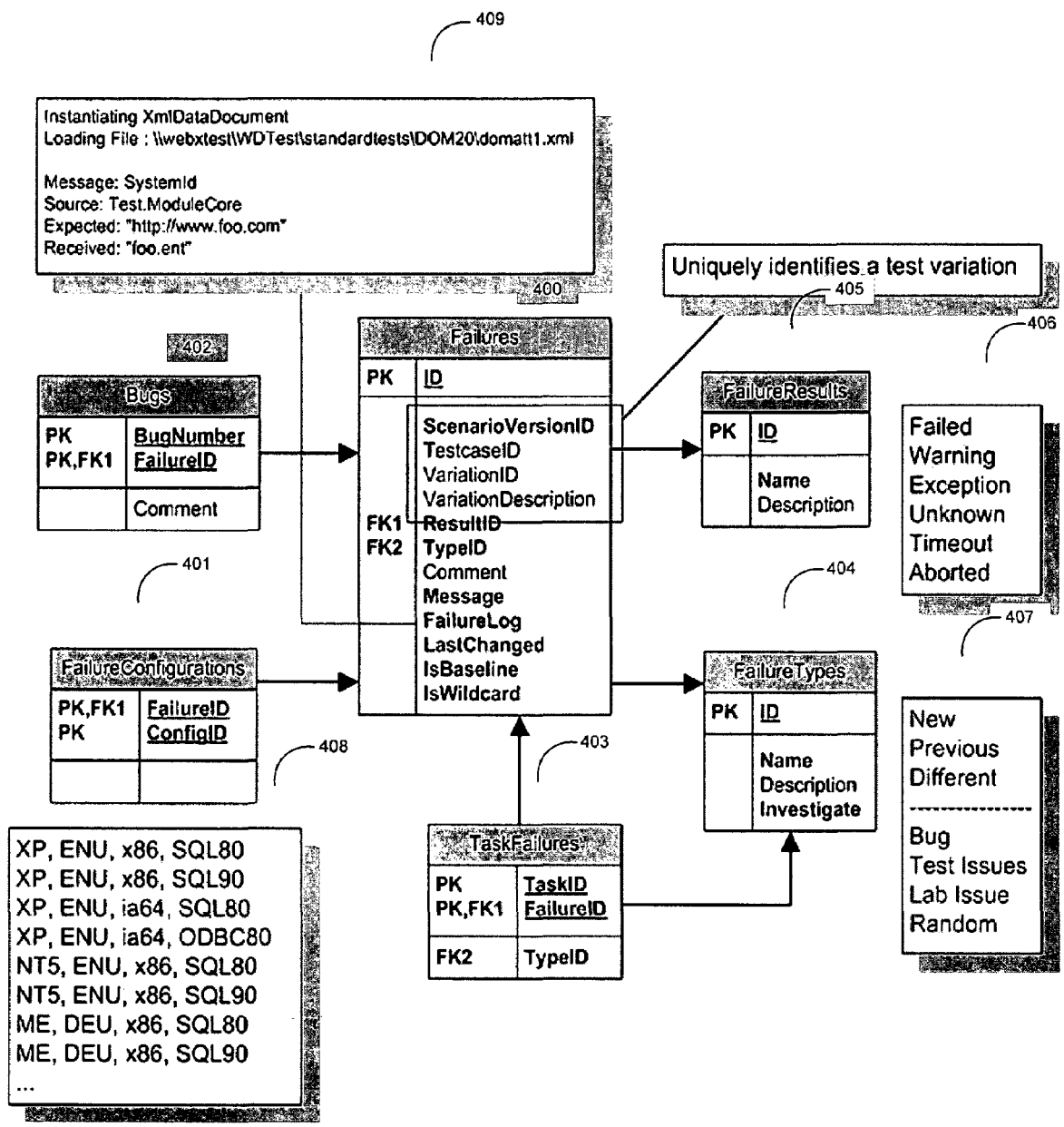
FIG. 4 illustrates a database schema that cross-references various properties associated to a representative failure.

Any properties of a result file or other information about a failure may be stored in a linked database location allowing convenient access to the information. In the context of software testing, some information that is considered useful for automated analysis is illustrated in FIG. 4. FIG. 4 provides an exemplary database schema that links various test result information in a particularly useful way.

Exemplary Database Schema

While the schema provided in FIG. 4 will be understood by those familiar with database design, a brief general description may be of use for the uninitiated. Each of the tables represented in FIG. 4, e.g., Failures 400, Bugs 402, FailureConfigurations 401, etc. contains two columns, a right column and a left column. The right column identifies the data columns of the represented table in a database. Therefore the Failures table 400 in the middle of FIG. 4 represents a database table with data columns for ID, for ScenarioVersionID, for TestcaseID, and so on.

The left column of FIG. 4 identifies which column headers in the right column will be used as primary keys ("PK") or foreign keys ("FK"). A primary key is an identifier that is unique for each row of a particular table. Therefore, the Failures table 400 has a column called "ID" that contains a primary key identifier for each row in the Failures table 400. A foreign key is a reference to a primary key or another unique key of another database table. Therefore FK1 in the Bugs table 402 refers to PK in the Failures table 400. The bugs table 402 has a compound primary key, consisting of a BugNumber and a FailureID.

FIG. 4 illustrates a number of failure properties that are represented in various tables of a database. First, a Failures table 400 can have rows that identify failure characteristics associated with test failures. A number of exemplary characteristics are provided. To highlight a few, the box at the top of the failures table 400 that "uniquely identifies a test variation" may include columns with specific information about a tested operation as well as the scenario in which the test was performed. This information may be as specific or as general as desired. Various identification properties are suggested. A failure log 409 can contain information about the failure used to analyze it, for example, the expected output and the received output for a particular failure. An "IsBaseline" column may be used to mark which failures are expected, as will be explained further with reference to the baseline concept, below.

A FailureConfigurations 401 table is provided that links to the Failures table 400. A link to the Failures 400 table is provided by using a foreign key in the Failures table 400, as shown, that maps to a FailureID column of a failure configurations table 401. A ConfigID, or configuration identifier, is provided in another column of the FailureConfigurations table 401, indicating a particular configuration, or scenario in which a failure occurred. Exemplary configurations corresponding to the ConfigID column of this table are provided in the gray box 408 beneath the table 401. By using a separate FailureConfiguration table, a failure can reference multiple configurations in which the failure occurred.

Similarly, a Bugs table 402 is provided that links failures in the Failures table 400 to bugs that are identified as being a potential cause of a failure. Multiple bugs can be referenced for a particular failure. The exemplary bugs table 402 shows a column for a bug number, a column for a failure ID, and a column for comments. If investigation of a bug leads to useful information, it can be stored as a comment associated with a bug number A TaskFailures table 403 is provided, also linked to the Failures table 400 as described above. The TaskFailures table 403 can contain a prioritized list of failures to investigate. This list can be based on information in the FailureTypes 404 table and link to the failure data in the Failures 400 table. The TaskFailures table 403 provides a friendly interface for use with the GUI for result analyzers wishing to investigate failures.

The FailureTypes table 404 is also illustrated as linking to a Failures table 400. By linking the failures types directly to the Failures table, a record can be kept of an assigned failure type, such as New, Previous, Different, Bugs, Test Issues, etc. In addition the investigate column may identify failures that require investigation. This categorization of failure type allows for additional time saving and prioritization of failures in the use of the invention.

Finally, a FailureResults table 405 in FIG. 4 is provided, linked to the Failures table 400. FailureResults indicates the result of the associated failure. The result can be "failed", "warning", or some other result that provides additional information about the failure, such as "exception," indicating that the tested operation threw an exception, "unknown" indicating that the result of the tested operation is not known, "timeout," indicating that the operation did not complete, or "aborted," indicating that an operation was aborted, etc.

The database schema provided by FIG. 4 will be instructive in understanding the GUI that exposes the data to users, as explained below. In short, the TaskFailures 403, FailureConfigurations 401, and Failures 400 tables can be used to access the rest of the information in the database. Through these tables, data for representative failures is linked to all corresponding tests, all corresponding configurations, and all instances of tasks to perform in investigating failures.

Baseline Failures

As suggested in the discussion above regarding linking and cross-referencing properties of failures to aid in failure analysis, various properties may be assigned to failures to further aid in classification and investigation of test failures. While any property that aids in failure investigation may be added either manually or automatically to the stored test result data, several useful properties have been incorporated into preferred embodiments of the invention. First, with reference to FIG. 4, note the presence of an "IsBaseline" column in the Failures table 400. Baseline is a concept that was developed for use with the invention; it indicates a set of expected failures. By adding a particular failure to the baseline, e.g., by entering "True" in the "IsBaseline" column, the associated failure can become classified as the expected value, allowing greater attention to non-investigated failures. In an industry where large volumes of test results are produced, minimizing redundant attention to test failures is desirable.

One powerful feature of the invention that may be included in various embodiments is to allow a failures baseline to be an accumulation across numerous tests. Result analyzers in the software testing industry no longer not have to pick a 'pristine' lab run to use as a baseline. Instead, a baseline can be determined by an aggregation of all lab runs and test results. Some failures can be included in a baseline from a first run, some from a second, and so on.

Baseline failures can be presented in any number of ways. In a GUI for exposing the database, baseline failures can be given colors to distinguish them from failures that need investigation. Also, failures that match the baseline could simply not be displayed unless requested by a result analyzer. There are limitless techniques available for deemphasizing the visual appearance of failures marked as baseline.

Figure 5:
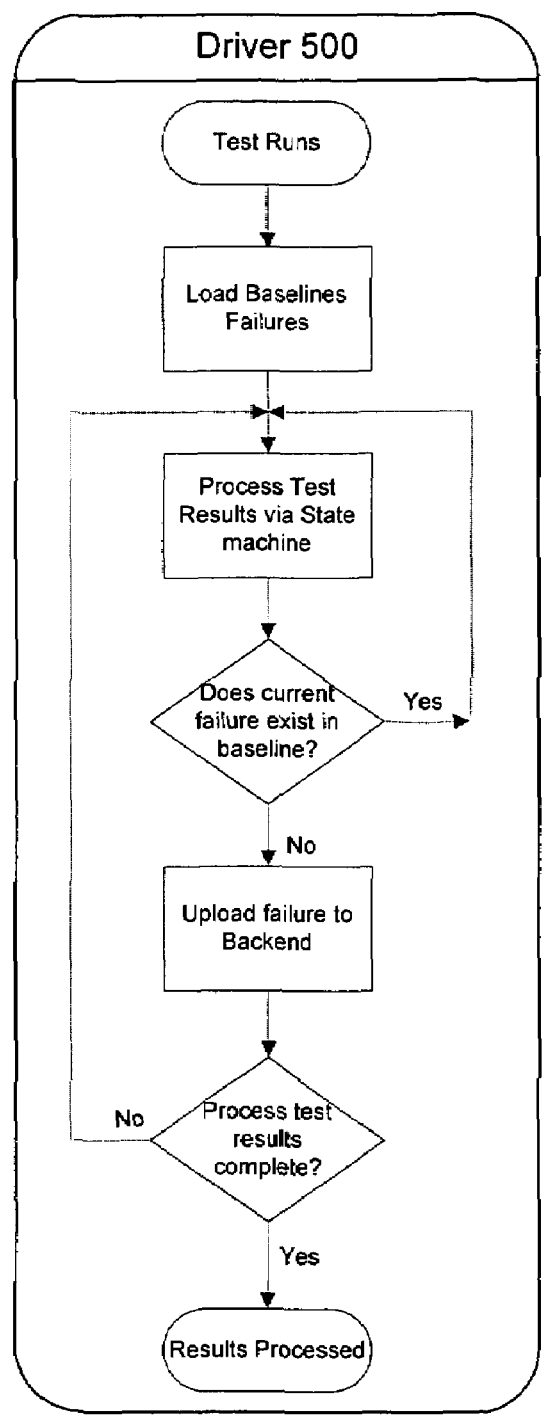
FIG. 5 illustrates a driver process that can be influenced by a result analyzer decision to mark a failure as expected.

Failures marked as expected, or baseline failures can also be treated differently throughout the automated test result analysis provided here. For example, tested operations that are expected baseline failures can be automatically discontinued by connecting the database to the servers in charge of orchestrating the automated testing. Less drastic treatment of baseline failures may include storing new failures associated with baseline failures in a separate location where they will not bog down the database server designed to provide data to test result analyzers. One such solution is provided in FIG. 5. Illustrated in FIG. 5 is a flowchart showing process steps for an exemplary native driver 500 such as the driver 201 provided in FIG. 2. In this exemplary embodiment, the driver 500 in FIG. 5 can first get the result file from a test run. The driver can then load baseline failures from a database. Next, it can process the results, which may involve parsing them as described above. Next, it can compare the results to the baselines. Note that this may be conducted even before uploading any failures to a database. In the embodiment of FIG. 5, failures that match the baseline may simply be discarded, in that the driver 500 moves on to process any further test results if it determines that a result matches a baseline. Otherwise, a non-baseline failure can be uploaded to a backend, or database. The process can be repeated as necessary for all failures. Once the non-baseline failures are uploaded to a database, they can be classified and cross-referenced as described above.

Failure Types

While the identification of baseline, or expected failures is particularly useful for automatic analysis of large volumes of test results, other features may also be identified, both automatically based on properties of failures, and manually based on input from a result analyzer. FIG. 4 presents some useful features to identify with failures. The "new," "previous," and "different" data in the exemplary FailureTypes table 404 may prove useful in results analysis. These are properties that indicate the failure requires investigation, and can be identified automatically or manually. If a new test failure cannot be matched to a stored failure, a new failure can be identified. New failures can be tagged as such and brought to the attention of result analyzers. Again, techniques for highlighting failures are unlimited and generally involve the use of color, weight, shading, and page placement.

Another useful metric for use in failure analysis is the "previous" label. A failure may be identified as corresponding to a failure that occurred previously but that has not been incorporated into a baseline of expected failures. In this case, the status of the corresponding failure is perhaps of higher priority than baseline failures, but of lower priority than new failures. In other words, a result analyzer may be more interested in new failures than in those that have occurred before although have not yet been added to a baseline or expected group of failures. Such failures are called previous failures for the purpose of this document, and can be highlighted in a way to demonstrate that they are this type of failure.

Another useful failure type that can be identified automatically, and manually if necessary is the failure that occurred previously, but failed for a different reason. This may be the case when, for example the first failure returned a warning, and the second failure returned a timeout. It could also be flagged by different operation outputs, both of which are failures. For the purpose of this document, such failures are called "different" failures, as shown in FIG. 4.

The useful ways of identifying failure types above can be further augmented by tagging failures with information about the type of investigation that should be made regarding the failure. The gray box for FailureTypes provides this information in the lower half of the box. The four exemplary ways to tag information as investigated are "bug," "test issue," "lab issue," and "random."

Summary

Figure 6:
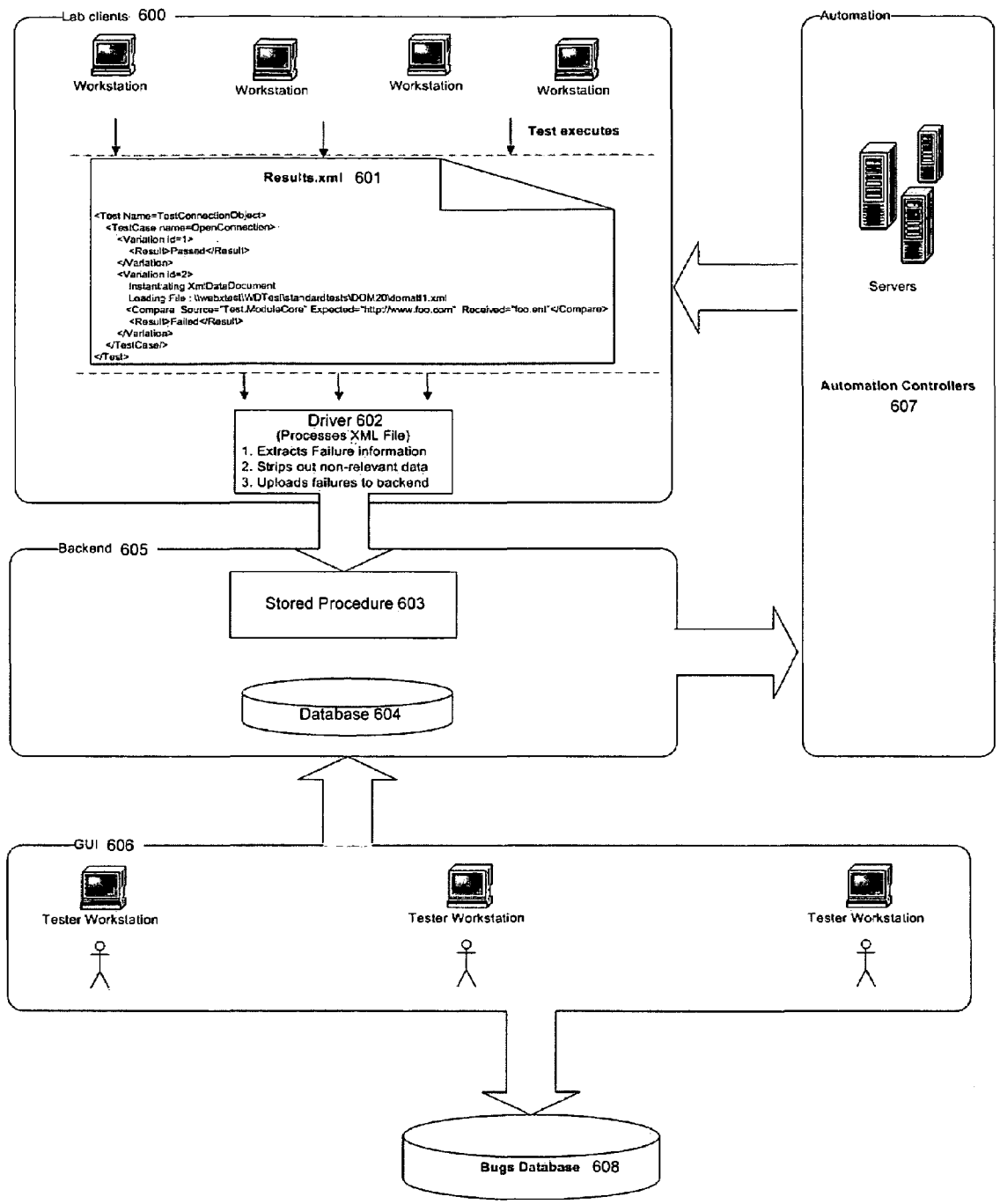
FIG. 6 illustrates an overview of the automated test result analysis system. Test results are processed by a driver, classified in a backend, and exposed through a GUI to result analyzers.

In summary, refer to FIG. 6 for an overview of the systems and methods for test result analysis. First, tested operations can run on a series of lab clients 600. This will generate a multitude of result files 601, which may be in XML format, as illustrated, or some other computer readable format. These result files 601 can be parsed by a driver 602, which can extract failure information, strip irrelevant information, and upload the parsed information to the backend 605. The backend comprises one or more stored procedures 603 and a database 604. Here, parsed failure data can be classified and cross referenced, as illustrated in connection with FIG. 4. The failure 601 can be classified according to expected characteristics. New failures may be identified for failures bearing characteristics that do not match any existing failures. Useful aspects of failures data can be separately cross-referenced to failures in the database, providing addition analysis power. Also, additional information regarding failures may be identified and cross-referenced. This additional information may include identifying a failure as an expected failure. Such information can be delivered back to automation controllers 607 to influence future testing, as desired. This information can be used in the GUI 606 to indicate failures to be highlighted, for example by using colors for failure types. The GUI 606 exposes the database 604 to result analyzers, or "testers." Testers may then update the data in the database as information is discovered about failures, thereby influencing future testing procedures. The next section will provide additional detail about aspects of the GUI.

A GUI for Exposing Test Results

This section provides detailed description of components and aspects of the invention set forth in the summary of the invention section, explaining and expanding upon the elements set forth in that section as appropriate.

A Graphic User Interface ("GUI") is provided to expose automatically analyzed results to result analyzers. The term "result analyzer" and "tester" are used interchangeably in this specification to refer to a human who investigates and analyzes test results. In general, the GUI can contain a workspace tree 700 that allows the tester to hierarchically navigate through various automated lab runs based upon dates, teams, components, versions, builds, or any other parameter. It can contain a visual query builder 702 that supports custom queries over the analyzed data. It can contain a failure tree that can display failures requiring investigation, e.g., failures that have not been designated as baseline failures. It can provide a space to comment upon investigated failures, and predefined stock comments may be associated with failures, such as "bug," "test issue," and "lab issue."

Two conceptually important components of the GUI are the workspace tree 700 and the query window 701. The workspace tree 700 may be a file tree that allows easily navigation through the vast number of lab runs and test results stored in the lab run database. It gives an overview of the organization, as well as high-level information of items that require investigation. An exemplary workspace tree 700 and query window 701 are provided in FIG. 7, which also points out two components of a query window 701 700, namely the query builder 702 and the query results 703 window 703.

Once a lab run or tests have been located using the workspace tree 700 700, the query window 7011 may be used to display the results. A query builder 702 portion of the GUI allows testers to execute custom queries over automation and failure data stored in a database. The results of queries are then presented in the query results 703 view, which can be represented as a grid or tree depending upon the data.

The organization of the workspace tree 700 may be structured to parallel a lab run automation database and allow testers to easily locate the lab runs and results they are looking for. The automated test result analysis may operate over numerous automation systems and backends. A set of default backends can be added to a workspace tree 700, while additional backends can be added by right-clicking on a backends node in the workspace tree 700.

Within each backend the organization of test results may vary, or can follow a systematic pattern such as organizing lab runs by Projects, Dates, Versions, Builds and Purpose. Test results can be further classified into Team, Tester, Tests, and Configurations.

Runs may be further categorized into dates, so testers can easily see what lab runs are going on this week, runs that are still active, or browse older runs for historical purposes.

The following folders may be used in the workspace tree 700 to organize test result data:

| | | |
|---|---|---|
| 1. [Me] | All lab runs including tests that a tester who is logged into the system is responsible for. | |
| 2. [Today] | All lab runs created today | |
| 3. [Week] | All lab runs created in the last 7 days | |
| 4. [Month] | All lab runs created in the last 30 days | |
| 5. Active | All lab runs that are within the expired date | |
| 6. Inactive | All lab runs that have expired | |

The workspace tree 700 can be further categorized into project version, purpose, build, and finally a list of lab runs. Once a lab run is found in the workspace tree 700, clicking on it can automatically execute a query in the query window 701 returning all the tasks that ran in the lab run.

Once a lab run node is selected, a number in parenthesis associated with each child node can be displayed. This number represents a number of Investigates, or failures that need to be investigated, for the corresponding Lab Run, Team, Tester, or whatever the current node represents.

Additionally, some numbers in parentheticals can be of varying colors, e.g., red, blue, yellow and green. These colors can indicate an investigational priority to a tester. For example, Red numbers can indicate one or more tasks that have automation errors, Blue numbers can indicate that a number of investigates are present but no tasks have automation errors, yellow numbers can indicate that there are no investigates, but some tasks are still running or waiting, and green numbers can indicate that there are no failures to investigate.

A tester may wish to first attack the failures with red numbers as they indicate that the presence of tasks that cannot be properly tested because they have automation errors requiring immediate attention. A tester can locate the tasks causing the problem by further drilling into the workspace tree 700. Once all red failures are dealt with, the number next to a particular tester's name can turn blue and he can start investigating non failures. The ultimate goal for every tester can be to have a green zero next to her/his name. This indicates that there are no further failures to investigate. Once lab run or tests are located in the workspace tree 700, a tester can see associated task results in the query window 701. In the software testing industry, here are three things that will generally require tester attention; automation errors, investigates, and improvements. Automation errors should be the first items to resolve. Automation errors exist for several reasons such as test timed out, crashed, or dependencies where missing. Once a tester has have resolved all automation errors he can turn to investigating failures. To view investigates for a particular task; a tester can simply double click on the task row in the workspace tree 700, which brings up a failure dialog. This includes a failure tree with nodes for all investigates that require attention. Finally, once all failures have been investigated, a tester can look at tasks that are designated as requiring improvements. Improvements is a term used for baseline failures that didn't fail for the current task. These improvements should be removed from the Baseline. The GUI can provide a menu item for accomplishing this removal.

When a failure requires investigation, it can be linked to a task that generated the failure, as discussed above. The GUI can expose these tasks to a tester and the failures can be investigated on a task-by task basis. First, a tester can identify a task that has investigates. Next, he can double-click on the task in the query results 703 window to show investigates, as defined above, for that particular task. A failure dialog can contain everything a tester needs to investigate the failures associated with a particular task.

A failure tree in the failure dialog can organize failures into the same structure as a test itself; e.g., testmodule, testcase, and variations. The testmodule node can also include the configuration a test was run against e.g., Windows XP, ENU, x86. To simplify the failure tree, icons and colors may be used to represent the state of a failure. The colors can represent failures, for example, in red, or warnings, for example, in yellow.

Figure 8:
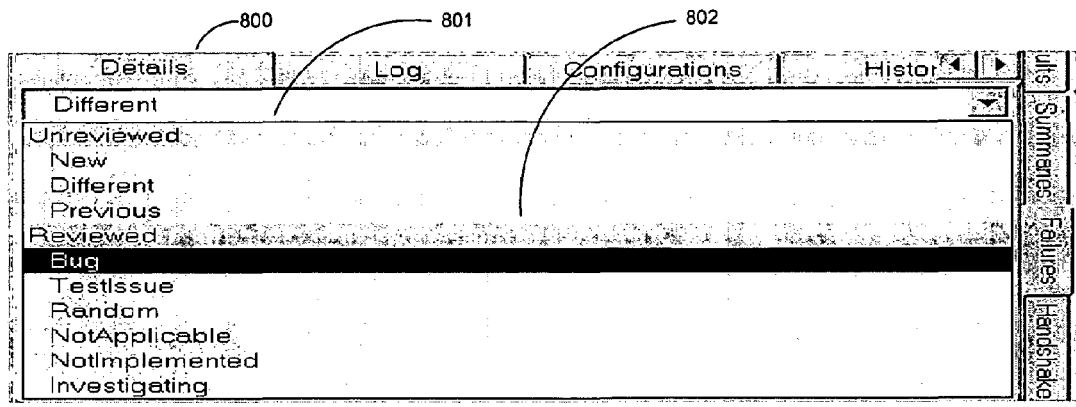
FIG. 8 illustrates further potential features of a GUI for use with the invention.

A failure type box representing the reason for a the failure can be displayed on the right side of the failures tree. This failure type box can display whether a failure is unreviewed and needs investigating—for example if the failure is a new issue, or a different issue. It can display whether a failure is reviewed if a tester indicates that the issued and tags it with a description such as bug, test issue, and so on. This notion is illustrated in FIG. 8. As indicated in the previous section, the identifiers in FIG. 8 can have the following meanings:

| | Unreviewed (not Investigated) 801 |
|---|---|
| 1. New | Failure is new, no baseline |
| 2. Different | Failure is different than existing baseline |
| 3. Previous | Failure matches a previous failure, no baseline |
| | Reviewed (investigated) 802 |
| 4. Bug | Failure was due to a product bug |
| 5. TestIssue | Failure was due to a test issue |
| 6. Random | Failure is difficult to reproduce and happens intermittingly |
| 7. NotImpl | Failure is due to a feature not yet implemented |
| 8. Investigating | Failure has been looked at, but not completely analyzed |

A Diff Window can be provided as part of a GUI. Such a window can play a critical role in helping testers understand what a failure is, and how it is related to a baseline if one exists. A left pane in such a window can show an existing baseline, the result of a test, and the output of a test. A right side can shows current failure information for a test to be compared to the baseline. The diff window can also show the exact lines and columns that are different in the of the baseline versus incoming failure.

In addition to indicating a reason for a failure, a tester can associate product bugs and explanations with their analysis. By entering a valid bug id the automated system can pull bug information associated with the bug. Comments may also be added to a failure, which may be useful to associate with a failure, especially when an issue is determined not to be a caused by a known product bug.

When a tester is done supplying information regarding a reason of a failure, a 'Submit' button can be provided that will update the failure to the server. The failure may be added to a tester's baseline by default. A baseline radio button can be provided if a tester does not wish to add the failure to their baseline, but would rather investigate the issue again later on.

Although a Diff Window can compare a failure to a baseline, there are many times a tester may still want to check out the log file. For example, the Diff Window doesn't show all the 'ignored' data that was stripped out by the driver 201, and it may only show one failure at a time.

Figure 9:
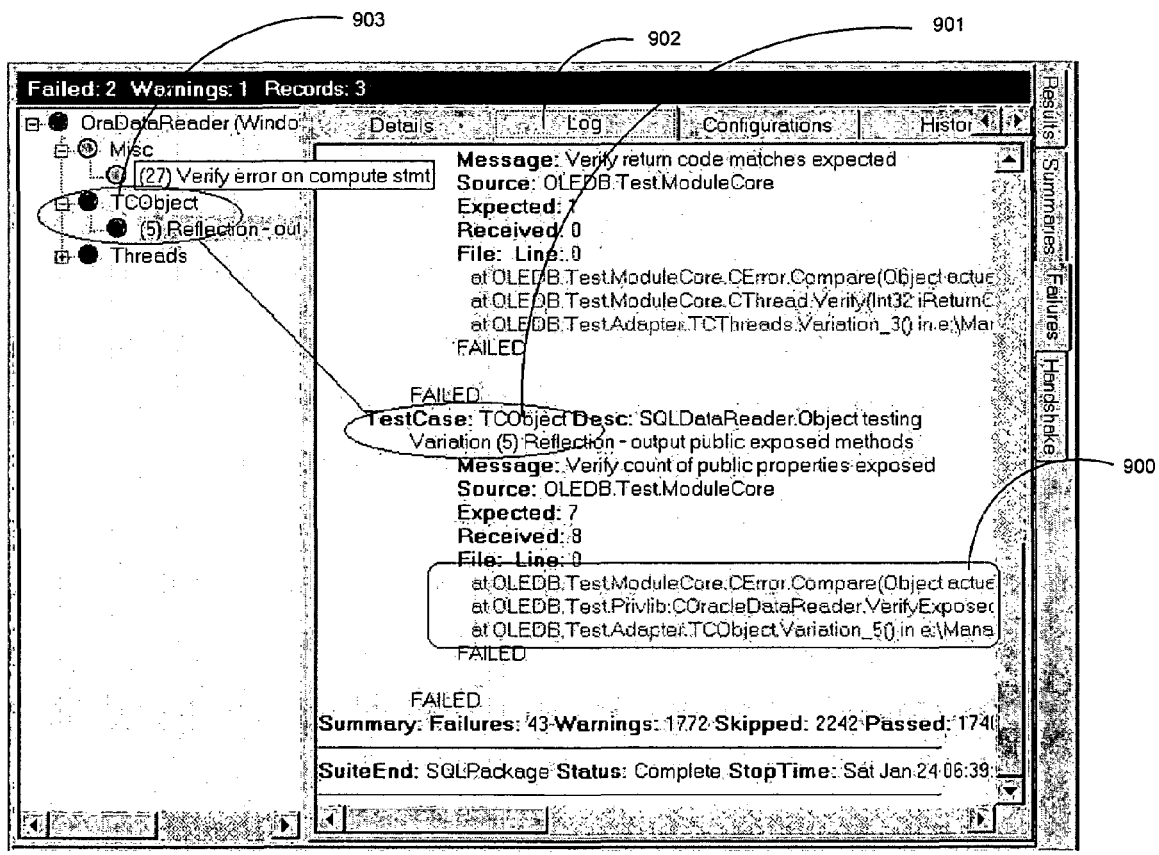
FIG. 9 illustrates further potential features of a GUI for use with the invention.

Instead of opening an entire log file and trying to find the section that failed, a failure log tab 902 can be provided that automatically parses the xml log and only shows testers the related sections for a current failure tree. In FIG. 9, log tab 902 has filtered out hundreds of test variations and allows testers to instantly focus on test variations they are concerned with. The 'ignored' text 900 may be shown in gray.

One feature of automated result analysis, as described above, is the ability to collapse failures across a large matrix of configurations. If the same failure occurs on many configurations the techniques herein can be used to link them to the same failure. Testers need only review a failure once, and all other configurations are automatically reviewed. A configuration tab may be provided in a GUI that allows testers to see all the configurations that a failure occurred on. Highlighting may be used to indicate the configuration of a current task.

In addition to 'cross-configuration' detection, the techniques herein can collapses failures across lab runs, known as 'failure-linking'. Instead of duplicating the failure, failures may be linked to a current lab run. This gives result analyzers the same benefit of 'cross-configuration' detection across numerous runs, as well as a complete history of when a test failed. For example, if three lab runs occur, investigating a failure in one lab run will automatically investigate it in others that failed for the same reason. A history tab may be provided to view the history of a failure. Highlighting can indicate lab runs that failed on the exact same configuration as a selected failure.

The GUI can be optimized to present investigates to result analyzers. However a result analyzer can also view all failures, including those that are already investigated. The view menu can be used to allow viewing only regressions, only investigates, both of them, or some other granular combination. Templates will be explained in more detail in a later section.

Failure classification control can be accomplished through the GUI as well. Recall that test result files often differ slightly even though related to the same failure. This is often due to timestamps and specific instance names. To allow classification despite this issue, recall that the automated test results analysis techniques allow a driver to support <ignore> tags around any text in a results file. Result analyzers can write tests to insert ignore tags on data they do not wish to use in classification. This allows for high-powered classification in situations where test result files are controlled by result analyzers. A result file that has properties tagged to ignore can appear as follows:

| Results.xml |
|---|
| <Variation Id="2" Desc="f2"> |
| ... |
|    <Ignore> |
|       2/19/2004 9:20:35 PM |
|    </Ignore> |
| ... |
|    <Result>FAILED</Result> |
| </Variation> |

Result analyzers sometimes cannot control test output to insert ignore tags directly into test results. This is often the case in software testing: product error strings containing generated data that is not foreseeable by a result analyzer may be returned, or a result analyzer may not feasibly control the test code. In this case the GUI can allow result analyzers to conduct pattern matching. A failure can be double-clicked, and the failure editor allows the result analyzer to directly edit a failure. By checking an 'Allow Wildcards' button, any characters can be replaced with abstract expressions. This feature is supported by MICROSOFT SQL SERVER®, and other commercial database software.

Also, when test result properties are not tagged to be ignored, a result analyzer may nonetheless control classification of failures by specifying comparison patterns. Each result file may be provided with a compare block providing useful comparison information. The following exemplary result file illustrates a compare block:

| Results.xml |
|---|
| <Compare Message="Failed to..." Source="Test.Demo" |
|    Expected="(null)" Received="System.Exception" |
|    File="c:\demo.cs" Line="5"> |
| ... |
|    <Details> |
|       <![CDATA[ at Test.TCMinimum.f3( ) in c:\CDemo.cs:line 103]]> |
|    </Details> |
| ... |
|    <Result>FAILED</Result> |
| </Compare> |

The compare block can be specified by result analyzers, and any portion of it can be used or ignored in classifying failures. For example, above, the file, line number, and stack trace could be ignored. This provides extra flexibility to result analyzers in classifying test results.

One of the powerful features of the invention is that it allows a failures baseline to be an accumulation across numerous tests. Testers no longer not have to pick a 'pristine' lab run to use as a baseline. Instead, a baseline can be determined by an aggregation of all lab runs and test results. Some failures can be included in a baseline from a first run, some from a second, and so on.

The GUI can provide an selection item to view the baseline. A query type combo box can be provided to allow result analyzers to quickly search for any schema they are interested in reviewing. The query builder 702 can be automatically asked to query all failures associated with the baseline.

One reason a result analyzer would want to review a baseline is to remove failures that no longer belong in the baseline because they have been resolved, and not failing anymore. The term for such failures in this document is improvements. Improvement are test variations that are passing, but that are indicated as expected to fail in a result analyzer's baseline. Improvements can be shown along with each task so result analyzers know which tasks have improvements.

Figure 7:
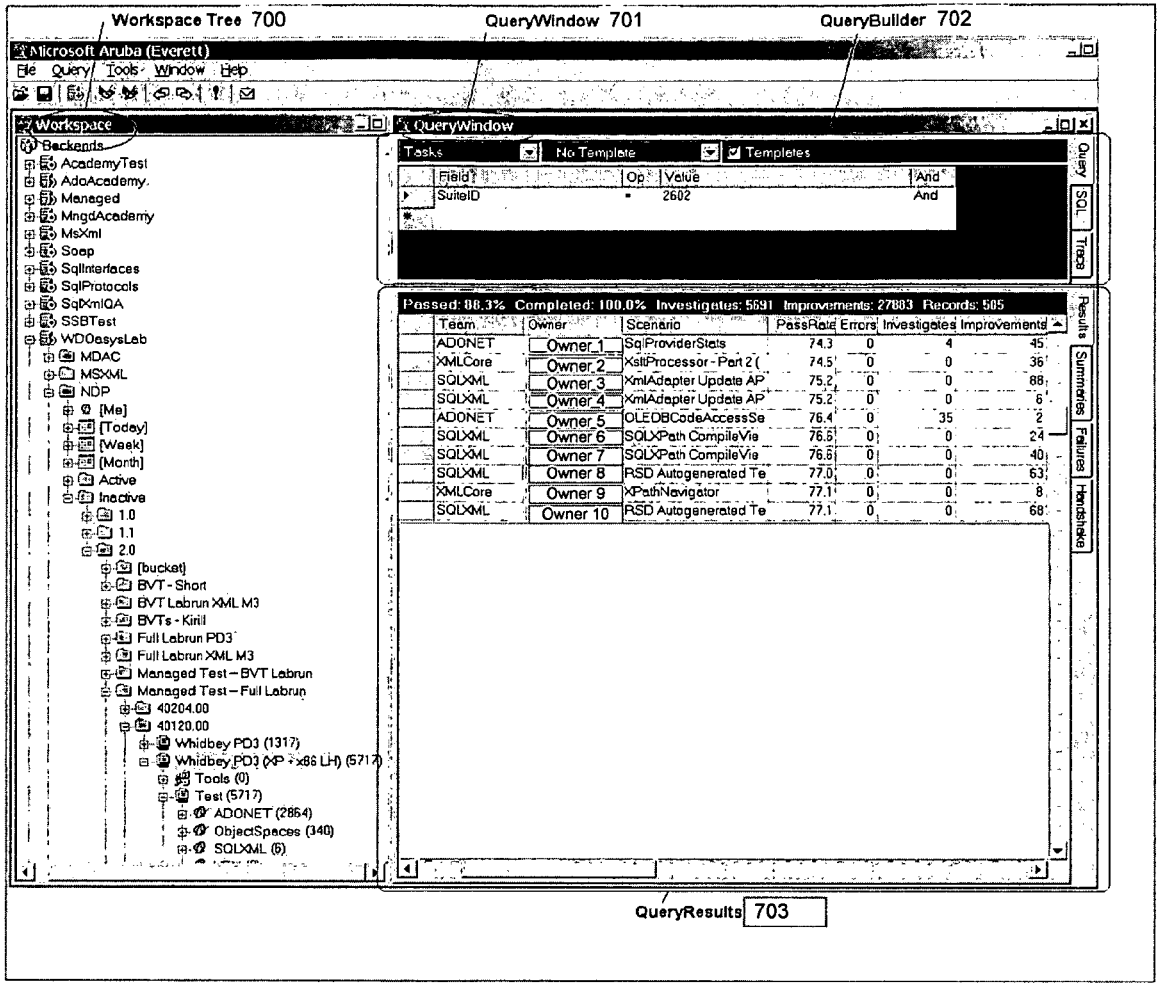
FIG. 7 illustrates an exemplary GUI with a workspace tree 700 on the left, and a query pane for displaying query results 703 on the right.

The query builder 702 tool illustrated in FIG. 7 can provide for assisted querying, allowing result analyzers to specify the properties of a query by clicking on the properties they want to include. This tool allows result analyzers to access a full range of underlying failure data.

To add a column to query builder 702, a menu item can be provided that shows all available tables and columns that a result analyzer can query from. By default such a menu may contain only the commonly used columns, since the database is quite large. To get all columns, a tester may right click on the query editor and choose 'Show All Columns' from the context menu.

The GUI can allow querying over numerous types of data, such as lab runs, tasks, failures, baselines, and so on. However all of the above are actually different schemas. This means that when looking at high-level lab runs, a result analyzer may not want to see individual failures, but data, columns, and rows associated with runs. A query types menu option may allow result analyzers to view different schemas, independent of what they are querying.

For example, consider a result analyzer who wants to find all lab runs that contain particular tests. He may not want to see all the tests of all the runs that match the query. Instead, he wants to see the lab runs. Likewise, a tester might want to search all his tests for a particular common failure, and wants to view test data, not failures. The query type function always returns the schema associated with the chosen query type.

Figure 10:
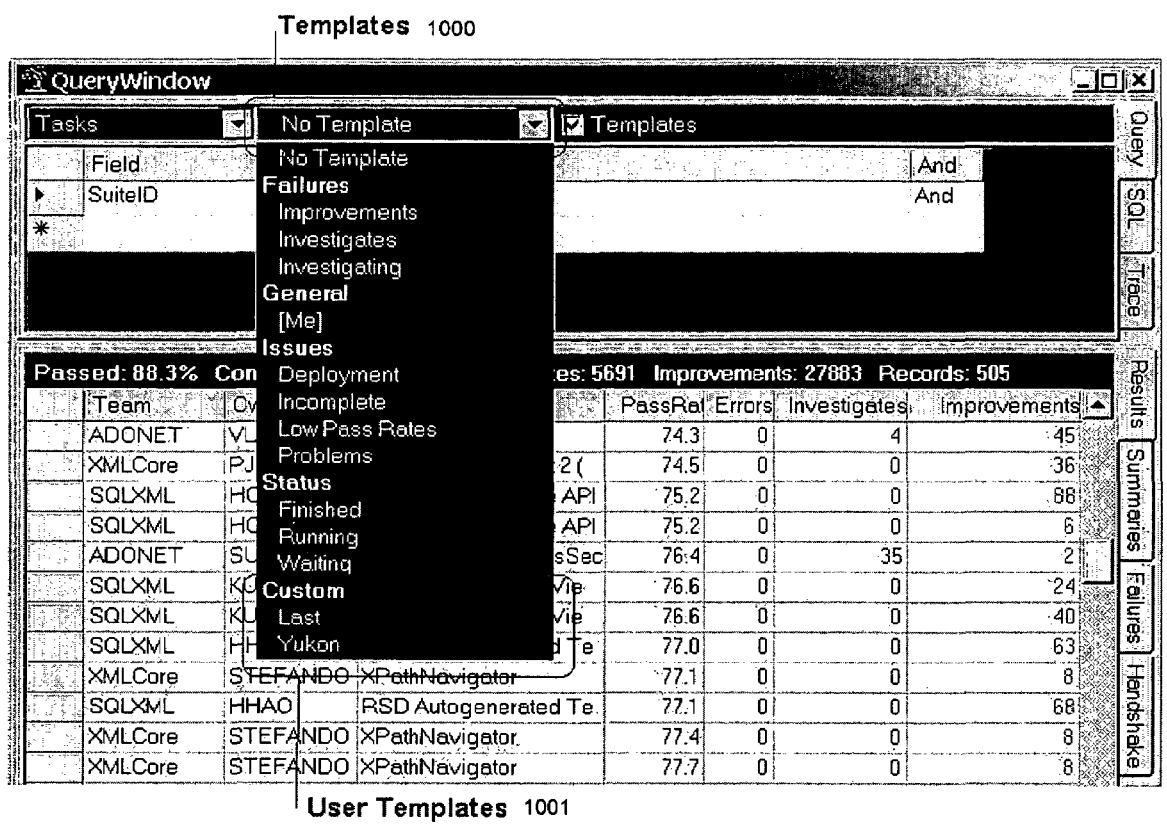
FIG. 10 illustrates further potential features of a GUI for use with the invention.

The GUI may further provide a menu item for save and loading queries. Once saved, the queries can be passed around in mail, and also show up in the tree for further convenience. Saved queries can be sent as email to others, as a means of informing other testers what needs attention. Also, saved queries can be used to build future queries. Saved queries can be displayed to provide a 'view' of what filters result analyzer typically use, and can be pieced together to form new queries. In this regard, templates may be provided by a GUI. Templates are identical to saved queries, except they save only a portion of a query. Anything a result analyzer added or changed can be applied to anything else in the tree. To save a template, a tester may, for example, right-click on the query builder 702 and choose [Templates|Save]. Then a corresponding template can appear on a template combo box, as shown in FIG. 10.

Commonly requested templates can be built in to the GUI to provide useful starting functions for result analyzers. Also, summarizing operations can be built in to summarize data. For example, a summary can show all the bugs associated with a lab run and prioritize them based upon the number of tests affected. Couple this with a 'Send As Email' feature and the invention provides now have an immediate way to inform the development team of the issues that need attention.

Once a tester has completed analyzing the failures the remaining step is to sign-off on the results, which is referred to here as a 'handshake'. The handshake is a result analyzer's acknowledgement that he is done looking at a set of tests such as a lab run, accounted for as many failures as possible in the time given, and given additional comments on the run and indicated overall quality level. The GUI can provide a way to view a handshake. For example, a tester can click a 'handshake' tab. The handshake tab may also be context sensitive to a node that is currently in view. For example, clicking on a team will show the team leader's handshake, clicking on an individual tester shows their handshake, etc. In addition, checkmarks can be displayed in the workspace tree 700 to identify who has submitted handshakes at all levels.

Figure 11:
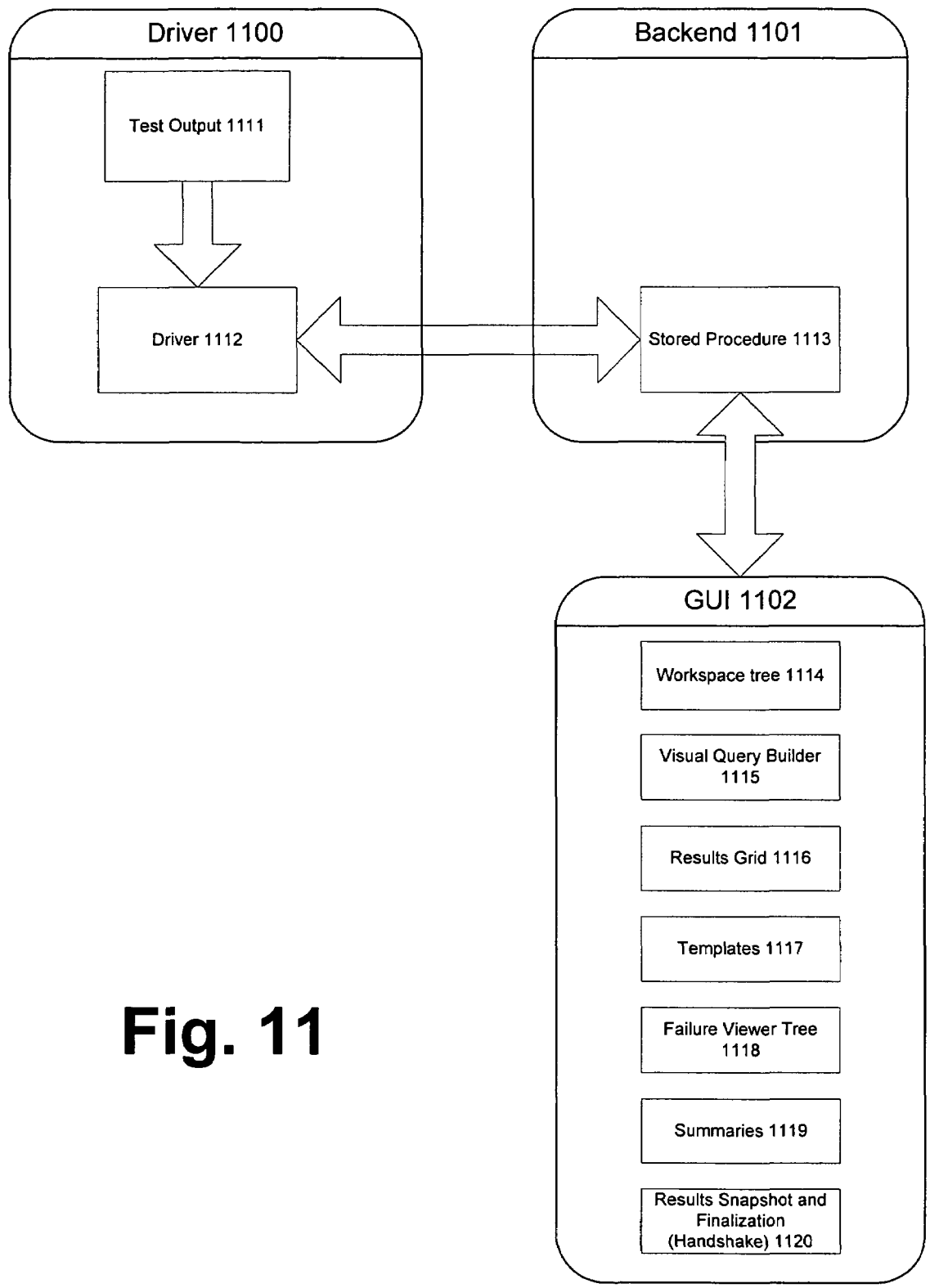
FIG. 11 illustrates the structure and relationship between the GUI, the backend, and the driver.

The various GUI functions and their connection to the automated result analysis framework is illustrated in FIG. 11. The result files parsed by the driver and classified by the stored procedure in the backend can be accessed and exposed by the GUI. In summary, the GUI can provide a workspace tree 700, a visual query builder 702, a results grid or tree, templates for building queries, a failure viewer tree, data summaries, and a handshake process for signing off on failures analysis.

Finally, although exemplary embodiments refer to utilizing the present invention in the context of a simple networked environment, the invention is not so limited, but rather may be implemented in connection with any computing environment, such as in a single computer, in a large and complex network, or in a distributed computing environment. Still further, the present invention may be implemented in or across a plurality of processing chips or devices, and storage may similarly be effected across a plurality of devices. Such devices might include personal computers, network servers, database servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A method for analyzing test results, comprising:
   reading test result data corresponding to at least two test failures;
   wherein a test failure comprises a failed attempt by a software application to conduct an electronic operation on a computer equipped with an operating system;
   wherein said test result data identifies an operating system associated with each test failure;
   determining a representative test failure in said test result data, said representative test failure corresponding to a first failed operation;
   determining at least one related test failure corresponding to a second failed operation, wherein said second failed operation is a same operation as said first failed operation;
   parsing said test result data to generate a list of operating systems corresponding to said representative test failure and said at least one related test failure; and
   linking said list of operating systems to said representative test failure in said database.

2. A method according to claim 1, wherein at least a portion of said method is accomplished by a stored procedure in a database.

3. A method according to claim 1, wherein said test result data identifies a computer processor associated with each test failure, and further comprising including computer processor identification in said list of operating systems.

4. A method according to claim 1, further comprising exposing said at least one representative test failure through a Graphic User Interface ("GUI").

5. A method according to claim 4, further comprising marking said at least one representative test failure in said GUI as an expected failure.

6. A method according to claim 5, further comprising deemphasizing said at least one representative test failure in said GUI with respect to any unexpected failures.

7. A computer readable medium bearing instructions automated test result analysis, comprising:
   instructions for reading test result data corresponding to at least two test failures;
   wherein a test failure comprises a failed attempt by a software application to conduct an electronic operation on a computer equipped with an operating system;
   wherein said test result data identifies an operating system associated with each test failure;
   instructions for determining a representative test failure in said test result data, said representative test failure corresponding to a first failed operation;
   instructions for determining at least one related test failure corresponding to a second failed operation, wherein said second failed operation is a same operation as said first failed operation;

instructions for parsing said test result data to generate a list of operating systems corresponding to said representative test failure and said at least one related test failure; and instructions for linking said list of operating systems to said representative test failure in said database.

8. A method for classifying test results, comprising:

extracting data from a test result file, wherein said test result file identifies a failed attempt by a software application to conduct an electronic operation on a computer equipped with an operating system;

comparing said data from a test result file to failure characteristics stored in a database, wherein first data that identifies a test operation is used in said comparison and second data that identifies a test scenario comprising at least an operating system identifier is not used in said comparison; and if a match is discovered from said comparing, identifying said data from a test result file and said failure characteristics as a single failure in a Graphical User Interface (GUI), and adding said operating system identifier to a list of operating system identifiers associated with said single failure.

9. A method according to claim 8, wherein said comparing is accomplished by a stored procedure in a database.

10. A method according to claim 8, further comprising cross-referencing said list of operating system identifiers such that it is accessible through said GUI from said single failure.

11. A method according to claim 8, wherein said data from a test result file is in Extensible Markup Language ("XML") format.

\* \* \* \* \*